(No Model.)

C. W. MERRILL.
VAPORIZER.

No. 472,133. Patented Apr. 5, 1892.

WITNESSES.
Atherton Hastings
Ellen B. Tomlinson

INVENTOR
Curtis W. Merrill
by Alex. P. Browne,
attorney.

THE NORRIS PETERS CO., PHOTO-LITHO., WASHINGTON, D. C.

UNITED STATES PATENT OFFICE.

CURTIS W. MERRILL, OF MALDEN, MASSACHUSETTS.

VAPORIZER.

SPECIFICATION forming part of Letters Patent No. 472,133, dated April 5, 1892.

Application filed November 27, 1891. Serial No. 413,187. (No model.)

*To all whom it may concern:*

Be it known that I, CURTIS W. MERRILL, a citizen of the United States, residing at Malden, in the county of Middlesex and State of Massachusetts, have invented certain new and useful Improvements in Vaporizers, of which the following is a specification.

My invention relates to that class of apparatus sometimes called "vaporizers," intended for the diffusion of a volatile liquid-disinfectant or other liquid. Its object is to improve the construction of devices of this class in the manner more particularly hereinafter pointed out.

Figure 1:
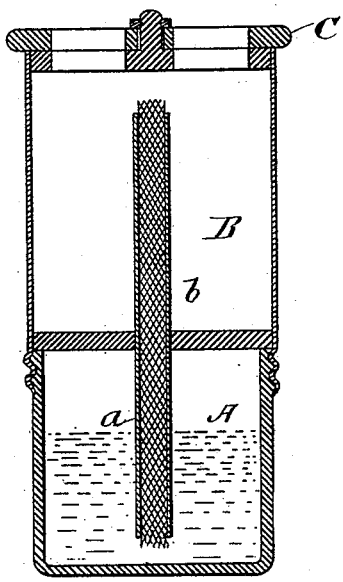
Figure 2:
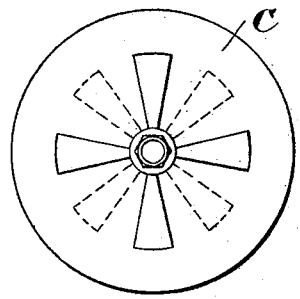

In the accompanying drawings I have represented at Figure 1 in vertical section a vaporizer embodying my present improvement, and at Fig. 2 a plan view of the top thereof.

My improved vaporizer consists of a vessel A for containing and holding the liquid to be vaporized, a chamber B, which may be described as a vaporizing-chamber, and a valved opening or outlet for said vaporizing-chamber, preferably formed of a double cover C, provided with perforations c, one part of the cover being made movable, as shown, to open or close the passage-way and to regulate the size thereof for the vapor in the chamber B. Apart from this outlet from the vaporizing-chamber B it is made tight, as shown; but communication between it and the liquid-holding vessel A is provided by a tube b, the interior of which is packed with capillary material, as shown at a.

In the construction shown in the drawings, which is my preferred form, the vessel A is made circular and of glass, and the chamber B is likewise circular and made of metal, a threaded connection between the two serving to close the chamber A tight and prevent unintended leakage therefrom, while at the same time the vessel A may be readily unscrewed and removed when it is desired to fill it or for other purposes.

The practical advantage which I believe my construction to possess over those heretofore in use lies in the fact that by it all escape of vapor into the apartment is prevented, except such as may be designedly allowed by opening the valved cover. Furthermore, by reason of the means shown for carrying the liquid from its storage-vessel to the vaporizing-chamber—viz., a tube packed with capillary material—I am enabled by varying the tightness with which the same is packed to practically control the rate at which the liquid is given off or vaporized.

In all devices of this character heretofore constructed, so far as I am aware, the capillary material has been used in the form of an open body or annular exposed wick, with which construction it is obvious that the amount of capillary action cannot be regulated.

I claim—

In combination, the liquid-holding vessel A, the vaporizing-chamber B, provided with a valved opening, a tube b, connecting the vessel A and chamber B, and capillary material a, packed in said tube, as set forth.

In testimony whereof I have hereunto subscribed my name this 23d day of November, A. D. 1891.

CURTIS W. MERRILL.

Witnesses:
ALEXANDER P. BROWNE,
ELLEN B. TOMLINSON.